(12) United States Patent
Rychlak et al.

(10) Patent No.: US 8,620,573 B2
(45) Date of Patent: Dec. 31, 2013

(54) METHOD FOR DETERMINING A ROUTE IN A NAVIGATION SYSTEM, AND NAVIGATION SYSTEM

(75) Inventors: Stefan Rychlak, Ilsede (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 13/000,173

(22) PCT Filed: Apr. 29, 2009

(86) PCT No.: PCT/EP2009/055169
§ 371 (c)(1),
(2), (4) Date: Mar. 18, 2011

(87) PCT Pub. No.: WO2009/156220
PCT Pub. Date: Dec. 30, 2009

(65) Prior Publication Data
US 2011/0191015 A1  Aug. 4, 2011

(30) Foreign Application Priority Data
Jun. 26, 2008 (DE) .................. 10 2008 002 695

(51) Int. Cl.
*G01C 21/00* (2006.01)
(52) U.S. Cl.
USPC ............... 701/408; 701/532; 701/1; 701/414
(58) Field of Classification Search
USPC ............ 701/532, 414, 123, 117, 423, 1, 31.4, 701/200, 210, 22, 23, 79, 410; 702/2; 700/245, 258, 250, 253; 182/82; 725/75; 180/65.21; 726/16; 430/567
See application file for complete search history.

(56) References Cited

U.S. PATENT DOCUMENTS

| | | | | |
|---|---|---|---|---|
| 5,487,002 A | * | 1/1996 | Diller et al. | 701/1 |
| 5,742,922 A | * | 4/1998 | Kim | 701/423 |
| 2004/0230376 A1 | * | 11/2004 | Ichikawa et al. | 702/2 |
| 2008/0133120 A1 | * | 6/2008 | Romanick | 701/123 |
| 2009/0063045 A1 | * | 3/2009 | Figueroa et al. | 701/210 |
| 2009/0254266 A1 | * | 10/2009 | Altrichter et al. | 701/200 |

FOREIGN PATENT DOCUMENTS

| | | |
|---|---|---|
| DE | 196 05 458 | 9/1997 |
| EP | 1 721 127 | 9/2005 |
| EP | 1 593 937 | 11/2005 |
| JP | 2000 002553 | 1/2000 |

* cited by examiner

*Primary Examiner* — Behrang Badii
(74) *Attorney, Agent, or Firm* — Kenyon & Kenyon LLP

(57) ABSTRACT

A method for determining a route from a starting point to a destination point in a navigation system for a motor vehicle, a factor which influences the energy consumption or the pollutant emissions while traveling the route being taken into account when determining the route. The factor describes the energy consumption or pollutant emissions during standstills of the motor vehicle while traveling the route and a navigation system for this purpose. A route calculation is improved with the goal of minimizing the energy consumption or pollutant emissions over the entire route and thereby contributes to environmental protection.

6 Claims, 1 Drawing Sheet

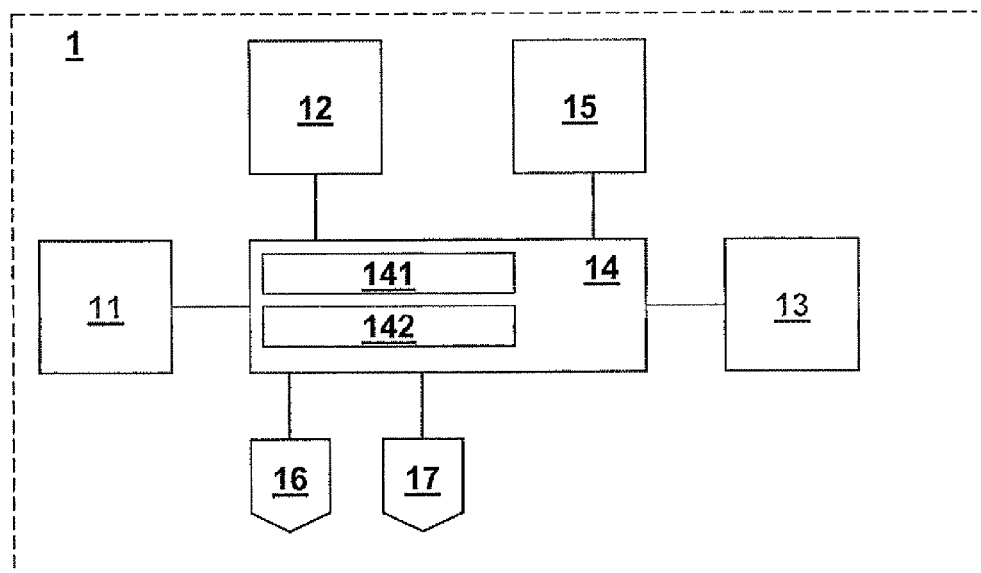

METHOD FOR DETERMINING A ROUTE IN A NAVIGATION SYSTEM, AND NAVIGATION SYSTEM

FIELD OF THE INVENTION

The present invention relates to a method for determining a route from a starting point to a destination point in a navigation system for a motor vehicle, as well as a navigation system which includes means for determining a route from a starting point to a destination point.

BACKGROUND INFORMATION

A vehicle navigation system is described, for example in European Patent No. EP 1 721 127, which determines a route from the current location to an entered destination and guides the user along this route after the user or vehicle driver has entered the destination and a current vehicle position has been determined with the aid of position determining means. For this purpose, the current vehicle position is regularly determined and compared with the calculated route, and in the event that a driving maneuver such as a turning action is required to follow the route, an indication thereof is output to the user.

A navigation system for motor vehicles is further described in European Patent No. EP 1 593 937, which determines a route from a starting point to a destination point, a factor which influences the energy consumption and thus also the pollutant emissions when traveling the route being taken into account in determining the route. The goal is the most energy-efficient route. Uphill and downhill routes as well as the vehicle load are taken into account for this purpose. The types of roads, in particular the road class, such as highway or regional road, as well as the road conditions, are also taken into account. Furthermore, known accident and traffic congestion hot spots are taken into account.

SUMMARY OF THE INVENTION

It is provided that not only the energy consumption and/or pollutant emissions produced while driving along route segments are taken into account when calculating the route, but also an energy consumption and/or pollutant emissions resulting from vehicle standstills while traveling the route. In particular, waiting times at intersections, junctions, traffic lights, railroad crossings and the like are taken into account. Thus a running power plant consumes energy even while a motor vehicle is at a standstill, although no route distance is being covered, for example to overcome the inner friction of an internal combustion engine as well as to drive so-called ancillary units such as the generator, air conditioning compressor, and the like. However, shutting down the power plant during longer foreseeable standstills is also associated with energy consumption, at least when the power plant is restarted, and in the case of internal combustion engines also involves increased pollutant emissions.

The factor or the values for energy consumption and/or pollutant emissions described by the factor are advantageously statistically determined from standstill times during past trips. For this purpose, the duration of the motor vehicle standstill is advantageously determined for a recognized standstill. The standstill duration is advantageously determined in relation to location. For this purpose, the location of the standstill is determined using position determining means, and the standstill duration is associated with this determined position, for example a determined intersection in the road network or a determined traffic light or the like. The standstill duration is also preferably determined in relation to the situation. For example, a determination is made as to whether the standstill occurs at an intersection while driving in a straight trajectory or, instead, upon making a left turn. This is based on the understanding that a left turn may involve a longer standstill than a standstill while continuing to drive in a straight trajectory, due to the need to cross a line of oncoming traffic. A left turn may be detected by the activated turn signal. Furthermore, the specific energy consumption or pollutant emissions is advantageously determined during a standstill, so that absolute values for energy consumption or pollutant emissions may be determined from the waiting time and the specific energy consumption or pollutant emissions. The specific pollutant emissions and energy consumption may preferably be further ascertained as a function of the season, since the values are foreseeably higher during winter operation than during summer operation.

These collected data are advantageously evaluated using statistical methods and stored, and they thus remain available for calculating a new route. These collected and evaluated data are also transferred to potential, additional, equivalent or comparable standstill locations which have not yet been traveled. After only a short period of time, data are thus available for standstill locations throughout the entire road network, on the basis of which a route may be calculated with the goal of minimizing energy consumption or pollutant emissions.

During the course of calculating a route from a starting location, which may be a point of origin or a current location, to a destination, not only are route-related energy consumption values taken into account, as is described in European Patent No. EP 1 593 937, but also the standstill-related energy consumption and/or pollutant emission values for the purpose of minimization over the entire route, if necessary weighted by additional optimization criteria such as the minimum travel time.

BRIEF DESCRIPTION OF THE DRAWINGS

The FIGURE shows a simplified block diagram of the portion of a navigation system important for the present invention for use in a motor vehicle.

DETAILED DESCRIPTION

The FIGURE shows a navigation system 1 for operation in a motor vehicle. A motor vehicle in this context is understood to be a vehicle having a power plant which drives the vehicle using energy. The power plant is, for example, an internal combustion engine, which is known per se, in the form of a diesel or spark ignition engine, which generates a driving torque for the vehicle and so-called ancillary units such as the generator, air conditioning system and the like as well as pollutants such as, in particular, nitrogen oxides and carbon dioxide from fuel. Since exhaust gas treatment measures known today are designed primarily for steady-state operation under partial load conditions, particularly high amounts of pollutants are generated and emitted, in particular during acceleration processes and when starting internal combustion engines of this type. Energy consumption is also elevated in this case.

Navigation system 1 includes a position determining means 11, which is known per se and is therefore not explained in greater detail here, for determining a current location, for example on the basis of radio signals of a satellite navigation system such as GPS or GALILEO; a digital map 12 in the form of a data memory such as a CD-ROM, flash memory or the like, including information contained therein on route segments and nodes such as intersections, junctions, etc. of a road network; a user interface 13 for entering a driving destination and for outputting guidance instructions for following a determined driving route; and a computer 14, including an operating program 141, among other things for determining a route from a starting location to a destination specified by the user and for generating guidance instructions by comparing a current location with the determined driving route.

Navigation system 1 further includes a statistics component 142, which is preferably designed as a software module which is processed by computer 14 of navigation system 1. The purpose of statistics component 142 is to compare the duration of a standstill with the durations of previous standstills upon detecting a standstill of the vehicle during a trip and to generate a new standstill duration, using statistical methods. In the preferred exemplary embodiment described herein, the standstill durations are determined in relation to location. For this purpose, possible locations on digital map 12, i.e., primarily intersections, junctions, traffic lights, railroad crossings and other locations where a vehicle regularly comes to a standstill, are associated with standstill durations in an additional data memory 15. These location-related standstill durations are updated to include currently determined standstill durations according to statistical methods. Furthermore, the standstill duration data are preferably collected, evaluated and stored not only in relation to location, but also in relation to situation. For example, intersections are assigned different standstill duration values, depending on the ability to drive in a straight trajectory or to turn right, on the one hand, and depending on the ability to turn left, on the other hand.

Statistics component 142 evaluates data during active guidance, i.e., while a route is being calculated and the vehicle driver is being guided along this route according to the driving instructions of navigation system 1, i.e., preferably also without active guidance. In a particularly advantageous manner, a high repetition rate of data collection obviously occurs, particularly if the same route is traveled regularly, for example in the case of commuters.

For standstill locations which have not yet been traveled, data of previously traveled, equivalent or comparable standstill locations may be advantageously transferred to the standstill locations not yet traveled.

If the energy consumption or pollutant emissions is/are known per unit of time for the vehicle standstill, values for the average energy consumption or pollutant emissions at a determined location may be calculated therefrom.

In addition to route-specific values for energy consumption or pollutant emissions according to European Patent No. EP 1 593 937, the values described for standstill locations, i.e., in particular values for intersections, junctions, nodes of the traffic network, and the like are also taken into account for subsequent route calculation. This makes the result of the route calculation or the statement about total energy consumption or total pollutant emissions over the entire route much more precise and reliable.

In an advantageous refinement of the present invention, statistics component 142 may be further used to determine the typical specific energy consumption values and pollutant emission values during a vehicle standstill, i.e., energy consumption per unit of time or pollutant emissions per unit of time. An energy consumption sensor 16, such as a fuel flow rate measuring device, and an exhaust gas sensor 17 are used for this purpose. The values detected by these sensors 16, 17 are preferably evaluated as a function of environmental conditions, in particular outside temperature or, as an alternative, as a function of the season, and stored in additional data memory 15.

In additional to an exclusively energy consumption-optimized or pollutant emission-optimized route calculation, a route may also be determined by taking into account a further optimization criterion, such as the minimum possible travel time, shortest route or the like.

Furthermore, the route may also be calculated exclusively as a route which has been optimized as the shortest or fastest route, or based on a mixture of these two criteria or other criteria. For one or more alternative routes of this type, the energy consumption or pollutant emissions may be additionally determined and output to the user as an additional selection criterion for selecting one of multiple routes. The user thus gains the ability to select a route which may not be the optimum one in terms of a primary optimization criterion, because this route produces less energy consumption or pollutant emissions than the optimum route.

In a refinement of the present invention, navigation system 1 may also output information about an imminent standstill of the vehicle to the user or vehicle driver during the course of active guidance if the vehicle location approaches, for example, an intersection. In the event that the average waiting time at this intersection exceeds a determined threshold value, a recommendation for shutting down the power plant may be advantageously output to the user. Alternatively, the power plant may also be automatically shut down if the vehicle does indeed come to a standstill at this intersection.

What is claimed is:

1. A method for determining a route from a starting point to a destination point in a navigation system for a motor vehicle, the method comprising:
   determining the route as a function of a factor which describes at least one of an energy consumption and pollutant emissions during motor vehicle standstills;
   statistically determining the factor from a duration of a current standstill and associated standstill durations;
   storing associations of the duration of the current standstill with locations to which the motor vehicle has not yet traveled, which associations are created only for locations that are determined to be similar to a current location of the motor vehicle; and
   responsive to a determination that the duration of the current standstill exceeds an average waiting time at the current location, outputting a recommendation for shutting down at least one of an energy source of the motor vehicle and a pollutant source of the motor vehicle;
   wherein the factor is determined in relation to an environmental condition including ambient temperature and season.

2. The method according to claim 1, further comprising determining the duration of the current standstill in relation to a situation that relates to a cause of the current standstill.

3. A navigation system for a motor vehicle, comprising:
   a processor adapted to:
      determine a route from a starting point to a destination point as a function of a factor which describes at least one of an energy consumption and pollutant emissions during motor vehicle standstills;
      statistically determine the factor from a duration of a current standstill and associated standstill durations;
      store in a storage device associations of the duration of the current standstill with locations to which the motor vehicle has not yet traveled, which associations are created only for locations that are determined to be similar to a current location of the motor vehicle; and responsive to a determination that the duration of the current standstill exceeds an average waiting time at the current location, output a recommendation for shutting down at least one of an energy source of the motor vehicle and a pollutant source of the motor vehicle;

wherein the factor is determined in relation to an environmental condition including ambient temperature and season.

4. The navigation system according to claim 3, further comprising an additional data memory for storing the factor in relation to at least one of a location and a situation.

5. The method according to claim 1, wherein at least one of the associated standstill durations is from a previous trip.

6. The navigation system according to claim 3, wherein at least one of the associated standstill durations is from a previous trip.

* * * * *

UNITED STATES PATENT AND TRADEMARK OFFICE
CERTIFICATE OF CORRECTION

PATENT NO. : 8,620,573 B2  Page 1 of 1
APPLICATION NO. : 13/000173
DATED : December 31, 2013
INVENTOR(S) : Rychlak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this
Twenty-second Day of September, 2015

Michelle K. Lee
*Director of the United States Patent and Trademark Office*